(No Model.) 2 Sheets—Sheet 1.
F. A. NUSBAUM.
OIL FILTER.
No. 493,644. Patented Mar. 21, 1893.
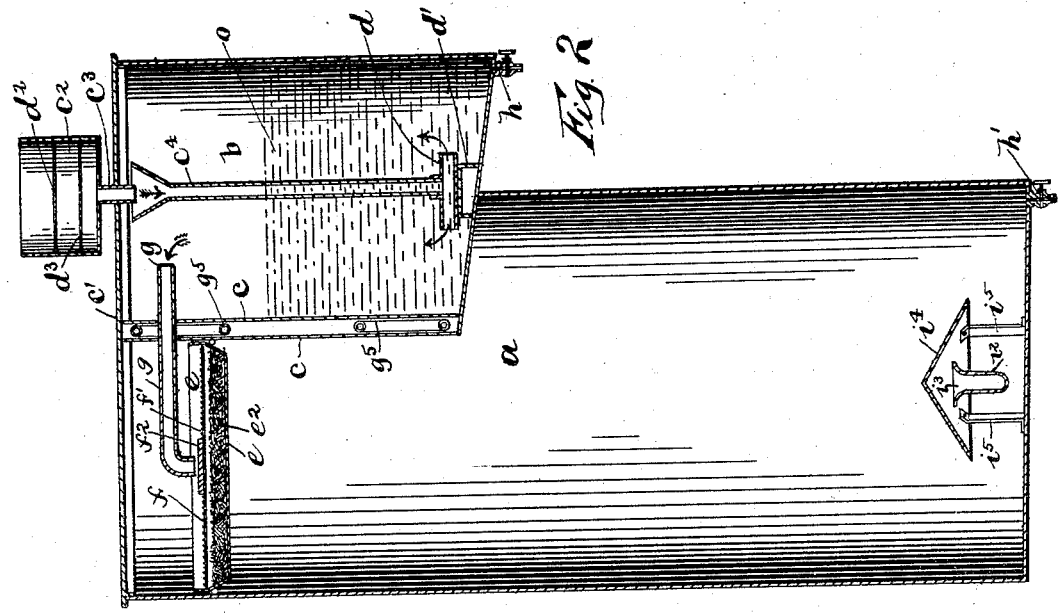
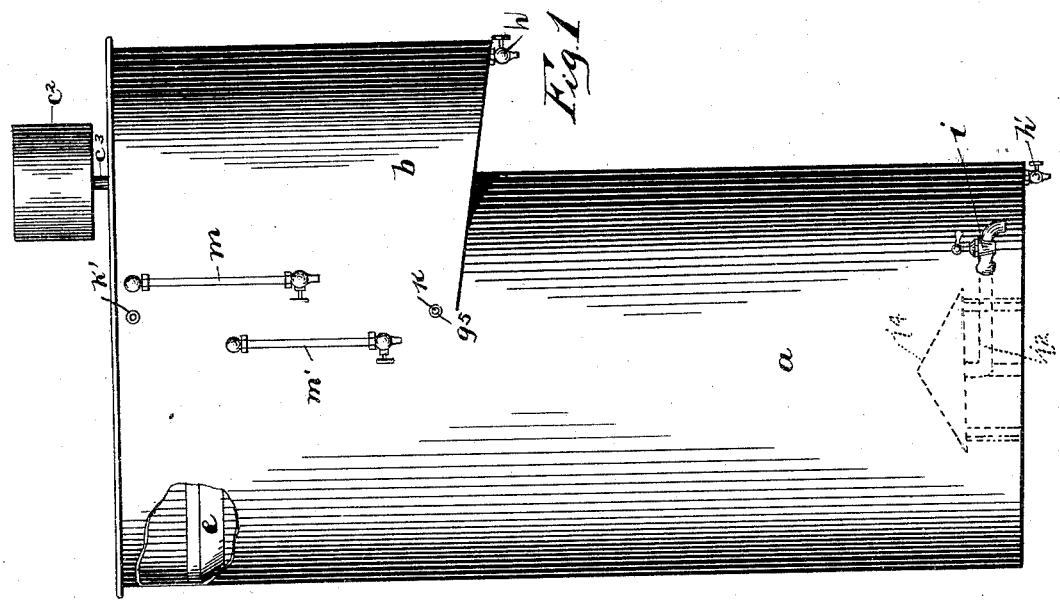
Witnesses
H. B. Bradshaw
C. E. Holdsworth
Inventor
Frank A. Nusbaum
By his Attorneys
Staley and Shepherd (No Model.) 2 Sheets—Sheet 2.

F. A. NUSBAUM.
OIL FILTER.

No. 493,644. Patented Mar. 21, 1893.

Witnesses
H. B. Bradshaw
C. E. Holdsworth

Inventor
Frank A. Nusbaum
By his Attorneys
Staley and Shepherd

UNITED STATES PATENT OFFICE.

FRANK A. NUSBAUM, OF COLUMBUS, OHIO.

OIL-FILTER.

SPECIFICATION forming part of Letters Patent No. 493,644, dated March 21, 1893.

Application filed October 3, 1892. Serial No. 447,588. (No model.)

*To all whom it may concern:*

Be it known that I, FRANK A. NUSBAUM, a citizen of the United States, residing at Columbus, in the county of Franklin and State of Ohio, have invented a certain new and useful Improvement in Oil-Filters, of which the following is a specification.

Figure 3:
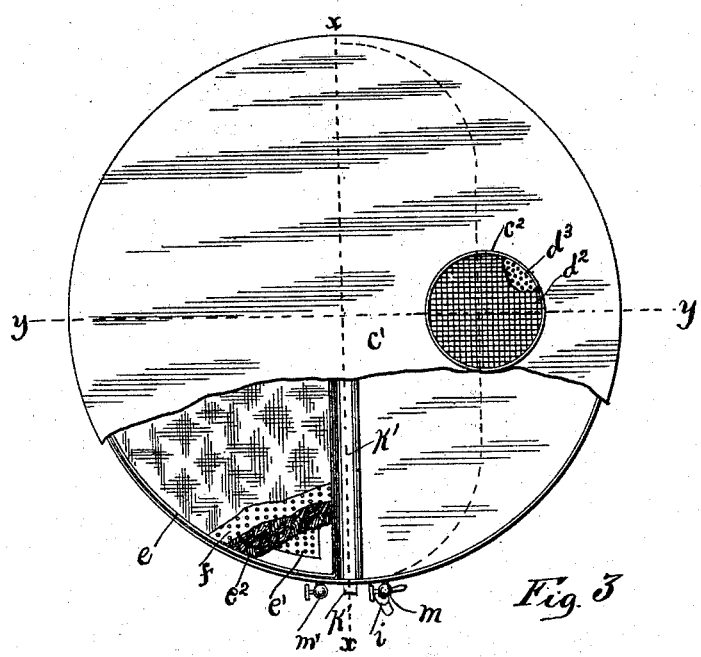
Figure 4:
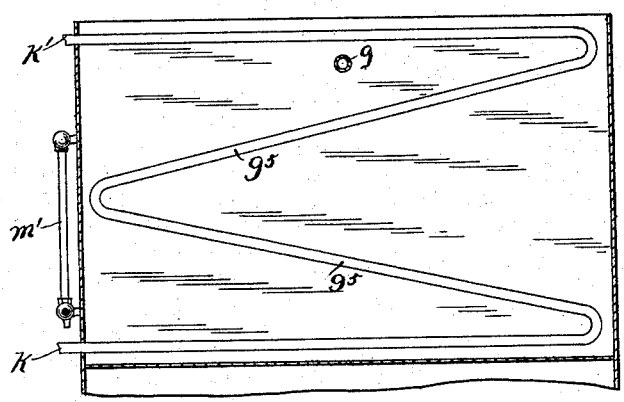

My invention relates to the improvement of oil filters, and the objects of my invention are to provide an oil filter of this class of superior construction and arrangement of parts; to so construct the same as to admit of the oil being automatically filtered therethrough and subjected to a thorough cleansing and to provide a two-compartment oil filter with superior means for imparting the desired heat to the oil contained therein; to construct my improved filter in a simple and inexpensive manner and to produce other improvements which will be more specifically pointed out hereinafter. These objects I accomplish in the manner illustrated in the accompanying drawings, in which, Figure 1 is a side elevation of my improved filter. Fig. 2 is a central vertical longitudinal section of the same taken on line $y\,y$ of Fig. 3. Fig. 3 is a plan view thereof showing a portion of the lid broken away and showing portions of the filtering parts broken away for the sake of clearness and Fig. 4 is a sectional view on line $x\,x$ of Fig. 3.

Similar letters refer to similar parts throughout the several views.

The body or casing of my improved filter is as shown, in two compartments, one of said compartments or sections preferably having the form of a partial cylinder $a$ and the smaller compartment $b$ being formed or connected with the upper portion of said compartment $a$, as shown. In forming the body thus described, I preferably provide the vertical tank or case $a$ with an off-set in one side of the upper portion thereof in which rests and from which projects the portion $b$, the latter thus being shorter than the portion $a$. The compartments thus formed are separated by a double partition or two parallel side walls $c\,c$.

$c'$ represents a top-piece or detachable lid which serves to form a common cover for both compartments.

$c^2$ represents a receiving cup or hopper which is supported above the compartment $b$ and which communicates with said compartment $b$ through the lid $c'$ by means of a suitable tube $c^3$. The inner end of this tube $c^3$ projects within the upper flaring end portion of a vertical oil pipe $c^4$ which passes downward within the compartment $b$ and terminates in the lower portion of the latter in a short T-pipe $d$, the latter being supported upon a suitable projection $d'$ in the bottom of said compartment. As shown in the drawings, the bottom of each of the compartments $b$ and $a$ is inclined for reasons hereinafter specified.

In constructing the oil receiving cup $c^2$, I provide therein a close fitting perforation or wire gauze disk indicated, at $d^2$, beneath which is arranged at a distance therefrom a perforated disk or plate $d^3$. In the upper portion of the compartment $a$, I support horizontally a filtering pan $e$, the bottom of which is as shown at $e'$ in Fig. 3, perforated. Upon this perforated bottom is supported waste or other fibrous material $e^2$. Fitting within the upper portion of the pan above this waste is a screen or perforated disk $f$ which is covered by a suitable straining or filtering cloth $f'$, preferably of the quality known as cheese cloth. Upon the center of this filtering cloth $f'$ is supported a flat deflector plate $f^2$, above which terminates the down-turned open end of the horizontal oil pipe $g$, which as shown in the drawings, passes through the double partition walls $c$ and serves to connect the compartments $b$ and $a$ in the upper portion thereof. At the lowest point in the inclined bottom of the reservoir $b$, I provide a valve controlled outlet $h$, while a similar outlet $h'$ is provided at the lowest point in the bottom of the compartment $a$.

$i$ represents a suitable faucet or stop-cock made to project through the wall in the lower portion of the compartment $a$, the stem of said faucet connecting within said compartment with a short pipe which leads as shown at $i^2$, to the center of the lower portion of the tank, said pipe being provided at its inner extremity with an upturned flaring inner end or mouth as indicated at $i^3$. This mouth $i^3$ is covered at a distance therefrom by a suitable conical hood $i^4$ which is supported from the body of the tank by suitable braces or brackets $e^5$ and which has its lower open side below the entrance to the mouth $i^3$ of the outlet pipe.

Within the space between the partition walls $c$ of the tank compartments, I support as shown in the drawings, a steam pipe $g^5$, the latter being preferably arranged so as to double upon itself at intervals or made to zigzag, as shown. This steam pipe enters through the outer wall of the tank at $k$ and passes outward at a point $k'$. Supported vertically on the outer side of the compartment $b$ is a gage glass $m$ which communicates at its upper and lower ends in the usual manner with the interior of said compartment. $m'$ represents a similar gage glass likewise supported on the outer side of the compartment $a$ in a position lower than that occupied by the glass $m$, the upper and lower ends of said glass $m'$ connecting with the interior of the compartment $a$.

Before putting my improved filter into operation, I cause the compartment $b$ to be partially filled with water as indicated in broken lines at $o$, the water thus supplied rising in the oil tube $c^4$ and the gage glass $m'$ to corresponding heights. The oil to be filtered is put into the receiver $c^2$ from which it passes through the filtering screens $d^2$ and $d^3$ through the tube $c^3$ and into the pipe $c^4$. A sufficient volume of oil being thus turned into the receiver to overcome the specific gravity of the water within the pipe $c^4$, the oil will pass downward through said pipe and the water contained therein, out through the ends of the T-pipe $d$ and thence upward through the volume of water $o$ until it escapes into the pipe $g$, through which it is carried into the compartment $a$. Within the compartment $a$, the oil is discharged into the pipe $g$ onto the spreading or deflecting plate $f^2$ thence on to and through the cheese cloth $f'$ and screen $f$ from whence it is filtered through the waste $e^2$ and through the perforated bottom of the pan $e$. The purified or filtered oil thus discharged from the filtering pan passes downward beneath the conical hood $i^4$ of the outlet and thence through said outlet pipe and faucet $i$. The heat necessary to retain the volume of oil contained in the compartments at the proper consistency, to allow the same to run freely is supplied by passing steam through the pipe $g^5$ and thus imparting sufficient heat to the partition walls to result in the latter heating the oil.

In order to relieve the bottoms of the compartments of collected sediments or foreign matter which may be filtered from the oil in the above operation, I provide the outlets $h$ and $h'$.

From the construction herein shown and described, it will be seen that the oil is subjected not only to the water cleansing or filtering process, but to the action of the perforated portions of the filtering pan $e$ and the waste contained therein. It will also be seen that the larger particles of foreign matter, will be removed from the oil as the latter is introduced into the receiver $c^2$ through the action of the screens $d^2 d^3$. The two-compartment filter arranged as described, thus admits of the oil being subjected to a thorough and effective filtering process, and admits of this object being accomplished in a simple and inexpensive manner.

It is evident that the gage glass $m$ will serve to show the condition of both the water and the oil of the compartment $b$, while the gage glass $m'$ will serve to show the condition of the filtered oil in the compartment $a$.

The means herein described for subjecting the oil to heat are such as to prevent the contact of the oil with the steam pipes and thereby obviate any tendency of the oil toward gumming or over-heating.

It will be observed that my improved oil filter is constructed in a compact and simple form and that the same may be produced at a reasonable cost of manufacture.

Having now fully described my invention, what I claim, and desire to secure by Letters Patent, is—

1. In an oil filter, the combination with the adjacent compartments $a$ and $b$, a volume of water $o$, partially filling said compartment $b$, an oil tube $c^4$ in said compartment and an inlet opening in the upper end of said compartment $b$ communicating with the upper end of said tube $c^4$, of a pipe $g$ connecting the upper portions of said compartments, a filtering pan supported within the compartment $a$ beneath one end of said pipe $g$, one or more screens and an intervening fibrous material in said pan and an oil outlet in the lower portion of said compartment $a$, substantially as and for the purpose specified.

2. In an oil filter, the combination with the adjoining compartments $a$ and $b$, a volume of water $o$ in said compartment $b$, a tube $c^4$ in said compartment $b$ as described, a receiving cup $c^2$ supported above the filter body and communicating with the upper end of the tube $c^4$ and one or more screens $d^2 d^3$ arranged in said receiving cup, of a filtering pan $e$ supported within the compartment $a$, one or more screens in said pan and a pipe $g$ connecting the compartments $a$ and $b$ and discharging upon said filtering pan and an oil outlet in the bottom of said compartment $a$, substantially as for the purpose specified.

3. In an oil filter, the combination of the compartments $a$ and $b$, an inclosed space between said compartments, steam pipes passing through said inclosed space, a volume of water contained in said compartment $b$, a tube $c^4$ extending within said compartment, an inlet opening in the upper portion of said compartment connecting with said tube and an oil pipe $g$ connecting said compartments $a$ and $b$ and discharging in said compartment $a$, substantially as and for the purpose specified.

FRANK A. NUSBAUM.

In presence of—
C. C. SHEPHERD,
J. H. SHARP.